UNITED STATES PATENT OFFICE.

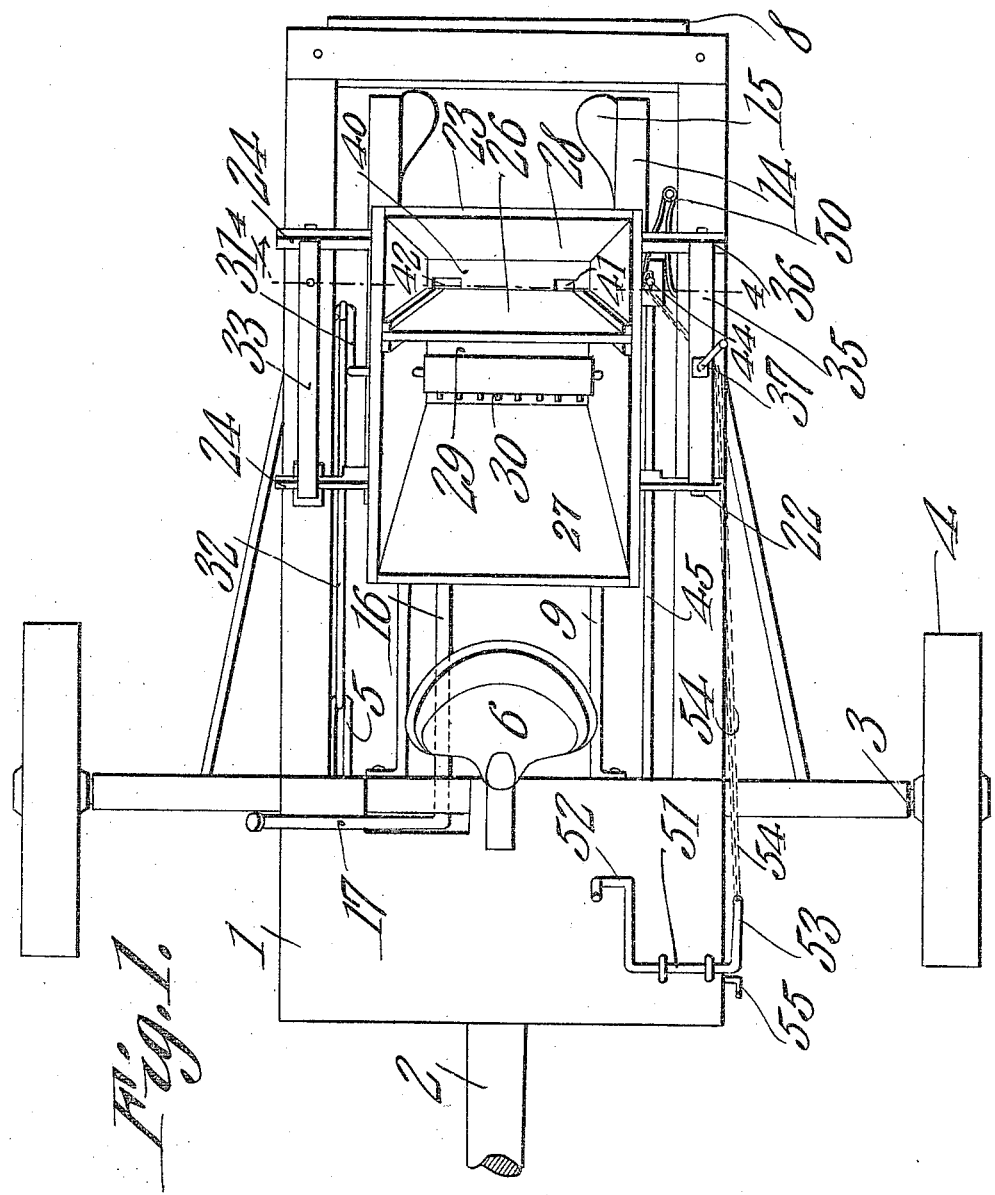

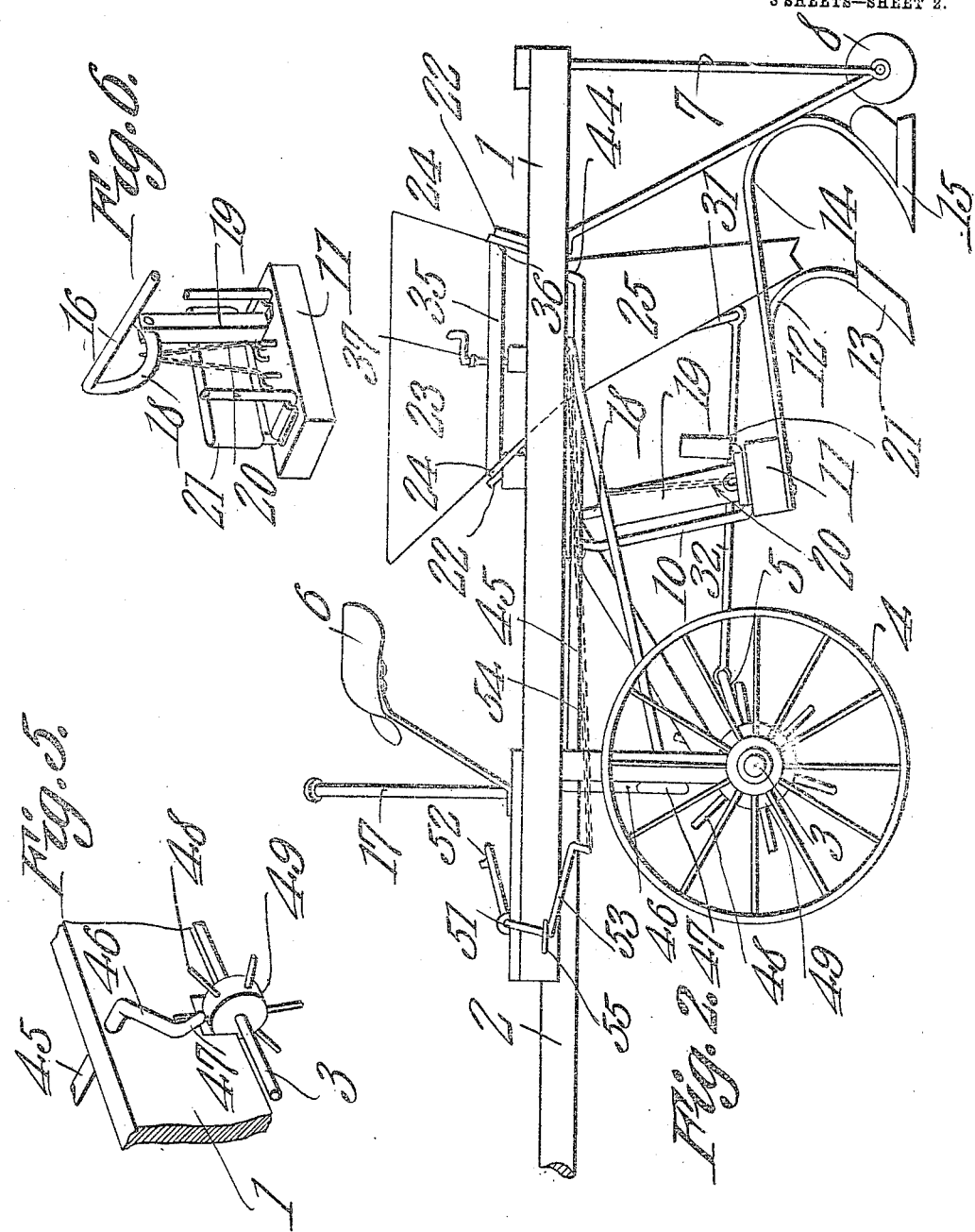

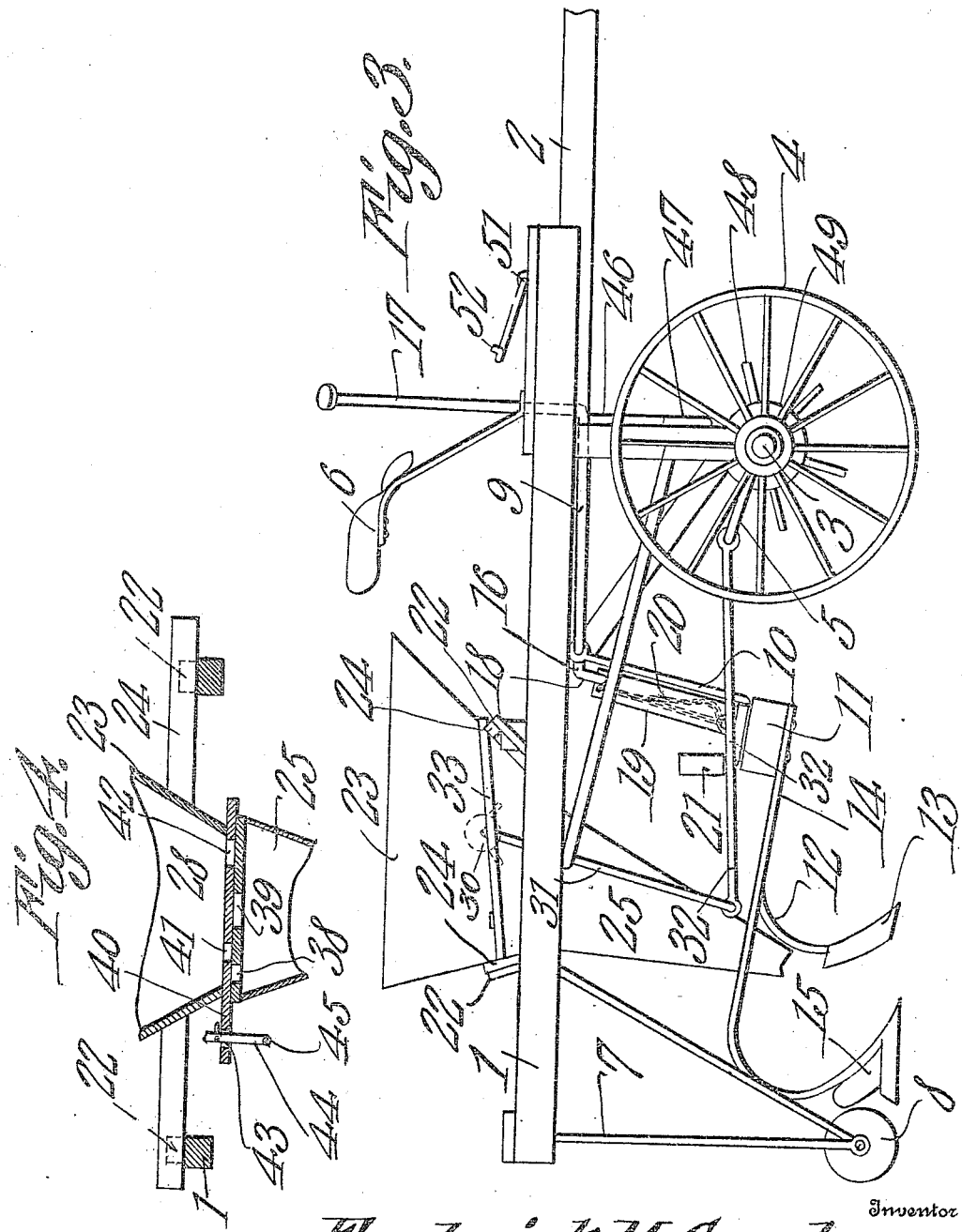

FREDERICK M. GORDON, OF CAVE SPRING, GEORGIA.

PLANTER.

959,852. Specification of Letters Patent. Patented May 31, 1910.

Application filed November 27, 1909. Serial No. 530,217.

*To all whom it may concern:*

Be it known that I, FREDERICK M. GORDON, a citizen of the United States, residing at Cave Spring, in the county of Floyd and State of Georgia, have invented a new and useful Planter, of which the following is a specification.

This invention has relation to planters and it consists in the novel construction and arrangement of its parts as hereinafter shown and described.

The object of the invention is to provide a planter which includes also a fertilizer dropper and which is provided with a shiftable hopper having seed outlet openings of different sizes. A slide is mounted for reciprocatory movement over the openings of the seed hopper and is provided with openings which correspond in size with the openings in the said hopper. Means is provided for reciprocating the slide and means is provided for operating an agitator or stirrer located in the fertilizer hopper. The seed and fertilizer hoppers are connected together and clamping and lever devices are mounted upon the frame of the planter and are adapted to hold the said hoppers in fixed position. By such an arrangement it will be seen that the hopper may be adjusted so as to position either the large or the small opening in the seed hopper so that it will register with the large or small openings in the slide. In other words if it is desired to plant small seed or a small number of large seed the hopper is so adjusted that the small opening therein will register with the small opening in the slide during the reciprocatory movement of the slide, and should it be desired to plant a large number of small seed or large seeds, the hopper may be so positioned that the large opening will register with the large opening in the slide during its reciprocatory movement.

In the accompanying drawings,—Figure 1 is a top plan view of the planter. Fig. 2 is a side elevation of the same. Fig. 3 is a side elevation of the same viewing the planter from the opposite side from that shown in Fig. 2. Fig. 4 is a transverse sectional view of a portion of the planter cut on the line 4—4 of Fig. 1. Fig. 5 is a perspective view of an intermediate portion of an axle shaft and adjacent parts used upon the planter. Fig. 6 is a perspective view of a portion of a lever mechanism used upon the planter.

The planter includes a frame 1 to the forward end of which is attached a tongue 2. The forward portion of the frame 1 is supported upon an axle 3 which in turn is mounted upon traction wheels 4. The axle 3 is provided at a point between its ends with a crank 5. An operator's seat 6 is mounted upon the forward portion of the frame 1. Brackets 7 depend from the rear portion of the frame 1 and a roller 8 is journaled for rotation at the lower ends of the said brackets and between the same.

A rearwardly disposed yoke 9 is attached to the forward portion of the frame 1 and lies under the intermediate portion thereof. Arms 10 are pivoted at their upper ends to the rear portion of the yoke 9 and carry a cross bar 11. A standard 12 is fixed to the cross bar 11 at a point intermediate the ends thereof and at its rear end carries a plow point 13 which serves as a furrow opener. Standards 14 are fixed to the end portion of the bar 11 and at their rear portions support plows 15 which serve as furrow closers. A shaft 16 is journaled under the forward portion of the frame 1 and at its forward end projects above the said frame in the form of a handle 17 which lies within reach of one occupying the seat 6. The rear end of the shaft 16 is formed into a laterally disposed crank 18. A bar or uprights 19 is interposed between the free end of the crank 18 and the cross bar 11 and chains or other flexible devices 20 are connected at their opposite ends with the crank 18 and the bar 11 respectively. An additional bar or weight 21 may be mounted upon the lower end of the arm 10 if desired. Thus it will be seen that by rotating or moving the shaft 16 by swinging the handle 17 toward the operator's seat 6 the crank 18 will rotate about the axis of the intermediate portion of the shaft 16 and the bar 19 will be forced down against the bar 11 and thus means is provided for depressing the said bar 11 and holding the same in a depressed position. By swinging the handle 17 in the opposite direction, the shaft 16 is rotated whereby the crank 18 moves about its axis and the bar 19 is elevated. Thus the bar 11 is not positively held in a depressed position but maintains a lower position by reason of its weight and the weight of its attachments. The chains 20 will limit the downward movement of the bar 11, but the said chains will permit the bar 11 to move in an upward direction until it comes in contact with the lower end of the bar 19. Thus it will be seen that means is provided for positively holding the furrow openers and closers against the soil or if the nature of the soil is such that no such positive means is necessary, the said furrow openers and closers may be permitted to move over the soil under the weight of the bar 11 and its attachments.

Stops 22 are mounted upon the sides of the frame 1. A hopper 23 is provided at its front and rear sides with cross bars 24 which are adapted to rest upon the side bars of the frame 1 and between the stops 22. A chute 25 depends from the bottom of the hopper 23. A partition 26 divides the hopper into forward and rear compartments, the forward one of which designated as 27 is adapted to contain a fertilizer and the rear one of which is designated at 28 is adapted to be used as a seed receptacle or hopper.

The hopper 27 is provided with an outlet 29 which is located within the upper end of the chute 25. The lower end of the said chute 25 is located behind the furrow opener 13. A stirrer 30 is located in the hopper 27 about the outlet opening 29 thereof and in turn is provided with a crank extremity 31 which is located exteriorly of the said hopper 27. A pitman rod 32 connects the crank extremity 31 of the stirrer shaft with the crank 5 of the axle shaft 3. Thus as the said axle shaft 3 rotates, means is provided for turning or oscillating the stirrer 30 back and forth over the outlet 29 of the hopper 27. A lever 33 is pivoted upon that side of the frame 1 which is adjacent the crank extremity 31 of the stirrer shaft 30 and said lever is adapted to bear at its rear end against the forward side of the rear cross bar 24 and at its forward end rests upon the upper edge of the forward cross bar 24 in a manner as illustrated in Fig. 1 of the drawings. Inasmuch as a pull is exerted upon the pitman 32 as the crank 5 moves in a forward direction, the lever 33 having its rear end against the forward side of the rear cross bar 24 will distribute the strain incident to the forward movement of the pitman 32 between the front and rear cross bars 24.

A clamp bar 35 is located over the opposite side of the frame 1 from that carrying the lever 33 and the said clamp bar 35 is provided with beveled ends 36 which bear against the inner faces of the front and rear cross bars 24. A clamping bolt or shaft 37 passes through the clamping bar 35 and engages the frame 1 and serves as means for holding the ends of the bar 35 down in close contact against the inner inclined faces of the front and rear cross bars 24. Thus it will be seen that means is provided for securely holding the hopper 23 in a fixed position upon the frame 1, but it is also possible by loosening the clamp bolt 37 and swinging the lever 33 to shift the said hopper laterally upon the frame 1 and when in a desired position by replacing the parts as indicated, the hopper is secured in an adjusted position. The seed hopper 28 is provided in its bottom with a relatively small opening 38 and a relatively large opening 39. These openings also communicate with the upper end of the chute 25 before mentioned.

A slide 40 is mounted for reciprocation in the bottom of the seed hopper 28 and is provided with a relatively small opening 41 and a relatively large opening 42. The openings 41 and 42 in the slide 40 are at a greater distance apart than the distance between the openings 38 and 39 in the bottom of the seed hopper 28. The slide 40 is provided at one end with a perforation 43 which receives the upper portion of a pin 44 which is radially disposed upon a shaft 45 journaled under the frame 1 of the planter. The forward end of the shaft 45 is formed into a crank 46 which in turn is provided with an angularly disposed extremity 47 located normally in the path of movement of pins 48 mounted upon a disk 49 fixed to the axle shaft 3.

A spring 50 bears at one end against the frame 1 and at its other end engages the radially disposed finger 44 carried by the shaft 45. The said spring 50 is under tension with a tendency to hold the lateral or free end of the said finger toward the hopper 23. A shaft 51 is journaled upon the forward portion of the frame 1 and is provided at its inner end with a crank treadle 52 located within reach of one occupying the seat 6. The outer end of the shaft 51 is provided with a crank 53 and the forward end of a chain 54 is connected to the extremity of the crank 53 and the rear end of the said chain is connected to the upper portion of the pin 44. The intermediate portion of the pin 44 passes around the bolt 37 or other part of the planter located farther away from the side of the hopper 23 than the said pin 44. A catch 55 is attached to the frame 1 and may be engaged with the crank 53 carried by the shaft 51 to hold the said crank in a forwardly disposed position.

From the above description it will be seen that when the planter moves in a forward direction, and the pins 48 rotate about the axis of the shaft 3, the said pins will alternately engage the angularly disposed extremity 47 of the crank 46 carried by the shaft 45. Thus the said shaft is turned against the tension of the spring 50 and the slide 40 is reciprocated back and forth along the bottom of the hopper 28. If the hopper 23 is so positioned with relation to the frame 1 that the opening 41 will register with the opening 38 small seed or a small quantity of seed is permitted to pass from the seed hopper 28 into the chute 25. If, however, the hopper 23 is so positioned that the large opening 42 will register with the large opening 39 in the bottom of the hopper 28, large seed or a great quantity of seed is permitted to pass from the said hopper 28 into the chute 25. Thus it will be seen that by providing means for shifting the hopper upon the frame of the planter, the planter may be adapted to plant large or small quantities of seed or large or small seed as desired. If, while the machine is moving over the ground it should be desired to interrupt the seed dropping operation, the operator depresses the treadle 52 upon the shaft 51, whereby the said shaft is partially rotated and through the crank 53 the chain 54 is moved longitudinally whereby the pin 44 is pulled away from the side of the hopper 23 and the shaft 45 is turned so that the extremity 47 of the crank 46 is moved out of the path of movement of the pin 48 carried by the disk 49. If such interruption is merely temporary it is maintained so long as the operator holds the treadle 52 in a depressed position. However, should it be desired to maintain the interruption for any considerable length of time, the catch 55 may be engaged with the crank 53 whereby the said crank will be held in a forward position and the operator may release pressure upon the treadle 52. At the same time that the seed is permitted to flow from the seed hopper 28 fertilizer is passed through the opening 29 out of the hopper 27 into the chute 25.

Having described the invention what I claim as new and desire to secure by Letters Patent is:—

A planter comprising a frame having stops, a hopper having at its forward and rear sides cross bars adapted to lie between the said stops, a clamp bar located at one side of the frame, a means for clamping said bar against the cross bar, a lever located at the opposite side of the frame and adapted to be swung so that one end will bear against one face of one of the cross bars and at the other end will lie over the edge of the other cross bar, a slide mounted for reciprocation in the hopper, said slide and hopper having openings adapted to register as the slide reciprocates, and means for operatively connecting the slide with the supporting wheels of the planter.

In testimony that I claim the foregoing as my own, I have hereto affixed my signature in the presence of two witnesses.

FREDERICK M. GORDON.

Witnesses:
J. H. GRIFFITH,
J. E. HARGIS.